April 12, 1960  C. L. GRANA  2,932,583
METHOD OF IMPREGNATING A MICROPOROUS ARTICLE
Filed Oct. 12, 1956
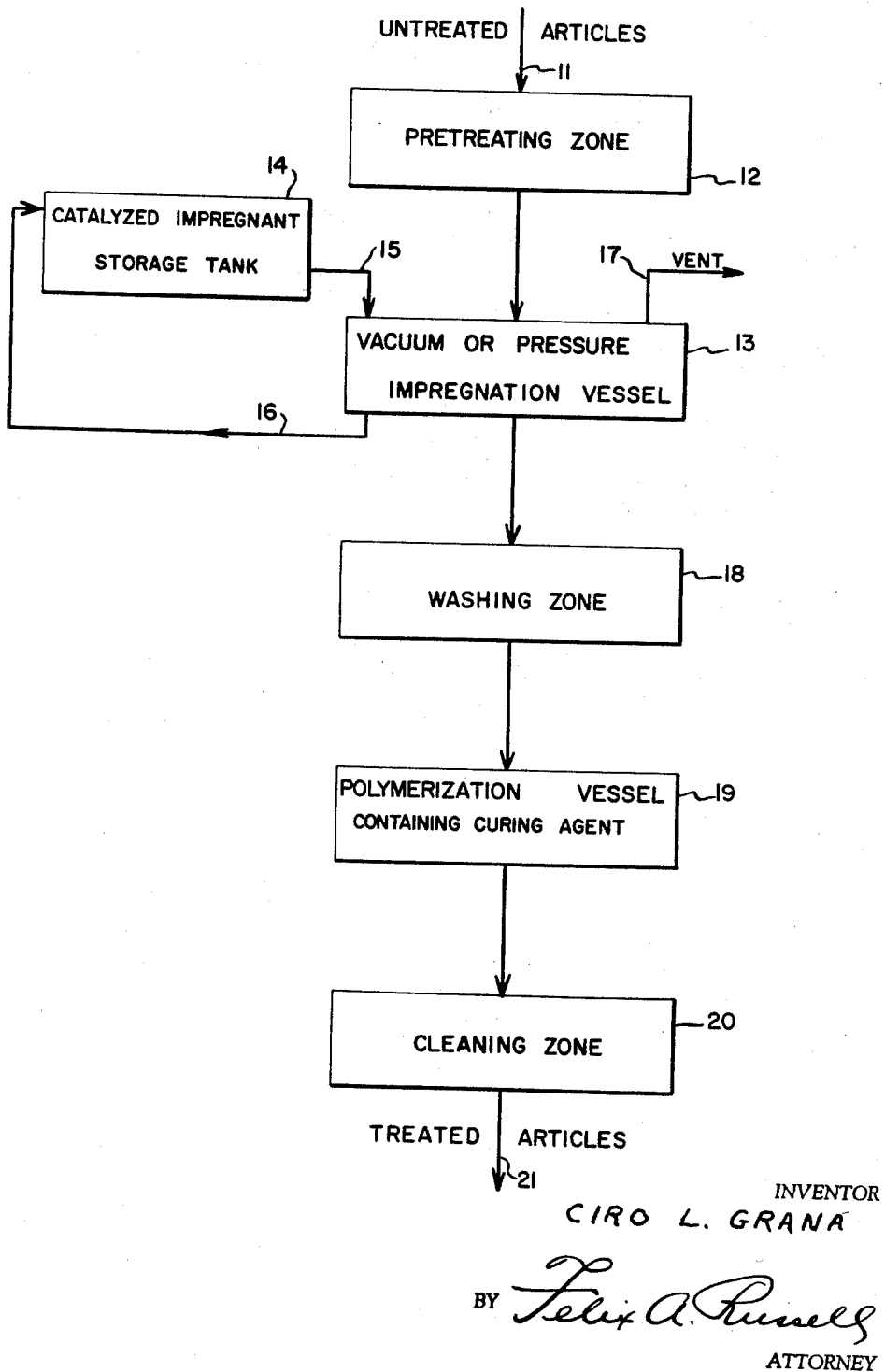
INVENTOR
CIRO L. GRANA
BY Felix A. Russell
ATTORNEY

United States Patent Office 2,932,583
Patented Apr. 12, 1960

2,932,583

METHOD OF IMPREGNATING A MICRO-POROUS ARTICLE

Ciro L. Grana, Cranston, R.I.

Application October 12, 1956, Serial No. 615,639

1 Claim. (Cl. 117—49)

This invention relates to improvements in the impregnation of articles having microscopic porosity therein with a liquid thermosetting plastic material for the purpose of preserving, water proofing, or making pressure tight the impregnated articles. More particularly, this invention relates to an impregnated article and a process for producing the impregnated article by filling microscopic pores within the article with a liquid thermosetting type resin to produce a leak-proof article that will not leach out during the washing cycle nor bleed out during the polymerization of the thermosetting material, thereby producing a more thoroughly impregnated article than has been hitherto possible.

It will be understood that the process herein described is a physical process, capable of acting upon thermosetting copolymers of diverse chemical organization, and therefore not to be limited to a specific impregnant.

There are several methods known to the art for producing an impregnated article in which a liquid plastic material is used to fill the voids of the article to eliminate microscopic porosity. These methods, however, have been found to present difficulties, particularly during the preheating, degreasing, impregnating, washing, and curing steps, all of which results in lack of uniformity of impregnation of the article. Heretofor impregnated articles have exhibited a tendency to leak under test because of the lack of uniformity which resulted in an undependable article. In order to overcome these apparent difficulties, it is an object of this invention to produce a process for the production of a uniformly impregnated article by impregnating the article in a bath of thermosetting type modified polyester resin having a low viscosity and molecular weight that will more thoroughly fill the microscopic pores within the article completely and effectively with a polymerizable resin. The invention also covers the use of perchlorethylene vapor in a pre-treating stage to effect the degreasing of the article prior to impregnation so that uniformity of impregnation takes place. The invention also incorporates a preheating step with the degreasing of the article prior to the impregnation procedure which assures the removal of moisture and oils from the surfaces and the microscopic pores of the article prior to the impregnation cycle so that uniform distribution and adhesion of the impregnant through the article is accomplished. The invention also covers the use of a small percentage of a suitable detergent in water maintained at about 110° F. that emulsifies with the resin to thoroughly wash off the article without leach out or dilution of the liquid impregnant that has been deposited in the microscopic pores of the article. This eliminates the use of many standard solvents that are presently used such as, acetone, MEK, methylene-chloride, Cellosolve, and the like; which solvents have a tendency to leach out and dilute the liquid impregnant that has filled the microscopic pores of the articles; and the use of a curing agent, an ethylene oxide adduct, a fractionated tallol acids, which effects a more rapid polymerization of the impregnant thereby reducing or practically eliminating any bleedout of the impregnant from the impregnated article; and further completely eliminates the necessity of any post polymerization clean-up of the article which is ordinarily caused from bleedout of the impregnant during the polymerization in a dry oven. The articles have a high uniformity in degree of impregnation throughout the finished product resulting in an article far superior to that obtained by methods heretofor known to the art.

The object of this invention is to treat articles containing undesirable microporosity with a liquid thermosetting modified polyester resin of low molecular weight in admixture with styrene after pre-treatment to eliminate the undesirable microscopic porosity and effect curing of the resin.

Another object of this invention is to impregnate microporous articles with catalyzed monomeric impregnant formed from a solution of a polyester of a glycol and an unsaturated dicarboxylic acid in admixture with styrene representing about 30 to 80 percent by weight of the polyester.

A still further object of this invention is to pretreat an article preparatory to impregnation by degreasing in the presence of vaporized perchlorethylene at elevated temperatures.

A further object of this invention is to incorporate the pre-heat and degreasing cycle of an article subsequent to impregnation by the use of perchlorethylene which removes undesirable moisture and oil, particularly those articles that have been treated with zyglo oil, a penetrant commonly used by manufacturers to determine the micro and macro porosity in articles, particularly metal castings prior to machining. The incorporation of this pre-heat and degrease cycle with the use of perchlorethylene not only eliminates a pre-heat oven but reduces the pre-heat cycle by one hour and so pre-treated articles therefrom obtain uniform impregnation with a catalyzed monomeric impregnant.

Another object of this invention is to subject a pretreated article, moisture and oil free thoroughly degreased, to a high vacuum within a vacuum chamber to effect high impregnation and to apply, after high vacuum treatment, a substantial high pressure to complete the thorough impregnation of the article.

Additional objects will become apparent from examination of the following flow diagram, description and claim.

An understanding of some aspects of this invention may be aided by reference to the accompanying drawing, which is a schematic flow diagram of one arrangement for practicing the invention.

According to one aspect of the invention, articles 11, having microscopic porosity, after being machined are passed to a pretreating zone 12 where they are effectively degreased and preheated at the same time by being subjected to perchlorethylene vapor which is maintained at an operating temperature of about 250° F. to 255° F. The articles are permitted to reach the temperature of the pretreating tank and to remain therein after reaching this temperature for a period of not less than 15 minutes. This pretreatment provides a thorough and complete degreasing and moisture removal not obtained by trichlorethylene so that the articles are free from moisture, oil, grease, dirt, etc., which assures minimum resistance from foreign contaminants within the voids of the article to impregnation.

It will be appreciated that the pretreating step may be divided into a preheating step, in which the articles are brought up to a temperature of approximately 225° F. to expel moisture from within the pores, and a degreasing step in which the articles are subjected to perchlorethylene vapors.

Following pretreatment, the articles are removed from the pretreating tank, cooled to room temperature, and passed into a closed impregnating vessel 13. Air is exhausted from the vessel until it is maintained under a high vacuum, preferably not less than 28 inches of mercury. The articles are maintained under high vacuum for a period of not less than 15 minutes to assure the substantially complete exhaustion of all air present in the vessel and wall thickness of the article. The impregnant, in the form of a catalyzed thermosetting polyester-styrene monomer, hereinafter more specifically described, is drawn from storage tank 14 through line 15 into the evacuated vessel until the articles are completely covered by the impregnant. During the time the articles are being covered with impregnant and for a subsequent period of from 5 to 10 minutes thereafter, the impregnating vessel is maintained at the high vacuum to further ensure that all bubbles in the material and within the articles have been effectively removed. At this time, the vacuum is released and the vessel is subjected to a relatively high pressure, for example, around 100 p.s.i., for a period of not less than 30 minutes to assure the complete penetration of the impregnant into the microscopic pores of the articles.

After the vacuum-pressure treatment, the unused impregnant is evacuated from the vessel under reduced pressure of from 5 to 10 p.s.i. through line 16 to storage tank 14, or, if a semi-continuous process is used, to another impregnating vessel loaded with articles that have been pretreated as described above and are in condition to receive the impregnant. After removal of the impregnant, the air pressure remaining in the vessel is released through vent line 17 to carry off any fumes in the vessel. The articles thoroughly impregnated throughout are then removed preparatory to further treatment.

The impregnant, capable of impregnating microporous articles, is a thermosetting copolymer impregnant suitable for use with our process and is an esterification product of an organic polyglycol with an unsaturated polybasic acid, diluted with monomeric styrene. The dilution may suitably be of the order of 75 parts of the polyester and 25 parts of the styrene, with a trace of an organic reducing agent such as hydroquinone. Such an impregnant is maintained as a liquid through lack of cross-linkage. The impregnant is more specifically defined by the following identifying properties and physical characteristics:

| | |
|---|---|
| Specific gravity | 1.075–1.09. |
| Viscosity, at 25° C | 180–250 cst. |
| Acid number (unreacted acid content) | 18–24. |
| Gel time, catalyzed with 0.9% A.T.C.— | |
| At 180° F | 30 to 50 min. in 19 mm. x 115 mm. test tube. |
| At 212° F | 5 to 8 min. in 10 mm. x 75 mm. test tube. |
| Solids | 100% by weight. |
| Styrene content | 30% to 32% by weight. |
| Flash point | 100° F. |
| Fire point | 105° F. |
| Color | Light amber. |
| Odor | Styrene. |
| Toxicity | Low. |
| Storage life | Over 6 mo. below 75° F. |
| Volumetric shrinkage | 6.8%–7.5%. |

Impregnants of composition analogous to that stated above and therefore responsive to our process are available commercially under the trade-names: Bakelite, Laminac, and Selectron.

The impregnants defined above are normally kept in storage tanks at a temperature of between 65° F. to 75° F. to maintain them in suitable working condition. The addition of a catalyst, for example an Impco catalyst, to the impregnant gives it a storage tank life of approximately six months. However, agitation and replenishment through usage increases catalyzed mixture life indefinitely and keeps the monomer in usable and uniform condition.

The catalyst used will depend, of course, on the monomeric proportions of the styrene to polyester. Any conventional styrene-polyester type catalyst may be used. Exemplary of such catalysts are peroxides (e.g. methyl ethyl ketone peroxide, cumene hydroperoxide, t-butyl hydroperoxide, etc.); isopropyl percarbonate (Pittsburgh Plate Glass Co.); and aliphatic azo catalyst (e.g., $\alpha,\alpha'$-azodiisobutyronitrile, etc.).

The impregnant, prepared for use by the addition of a suitable catalyst to the monomeric polyester of the glycol and an unsaturated dicarboxylic acid in admixture with monomeric styrene, is effectively controlled by testing its gel time, which must be between 30 and 50 minutes at 180° F., S.P.I. standards, when the test is conducted in a 19 mm. by 115 mm. test tube, or between 5 and 8 minutes at 212° F. when conducted in a test tube of 10 mm. by 75 mm. In the event the viscosity of the catalyzed monomeric solution does not increase appreciably and the gel time drops below the 30 minutes at 180° F. or 5 minutes at 212° F., then an inhibitor is required to increase the gel time and bring the impregnant into usable condition. In like manner, if the gel time should exceed the maximums set forth by the above testing method, then catalyst is required to be added in increments of 0.05% by weight of the monomer until the gel time falls within the specified limits of the test, which assures the most effective results for impregnation of the microscopic pores.

In cases where the gel time drops below the prescribed minimum, a suitable inhibitor is employed. Exemplary of such inhibitors are t-butyl catechol, picric acid, trinitrobenzene, 2,5-dihydroxy-1, 4-benzoquinone, and 1,4-naphthoquinone. For example, to control the drop in gel time, 10 grams by weight of para-tertiary butylcatechol is dissolved in 90 grams of styrene monomer warmed by tap water so as to dissolve the para-tertiary butylcatechol granules. The inhibitor solution thus formed is added to the impregnant in increments of 0.02% by weight until the desired gel time is reached. After addition of the inhibitor solution, the impregnant is allowed to stand for at least 16 hours before a recheck of the gel time is made to insure stability of the impregnant.

Articles drained and removed from the impregnating vessel 13 after impregnation as set forth above are thoroughly cleaned by passing through a washing zone 18 where an automatic surge mechanism rinses the articles employing a small percentage of suitable detergent, such as Impco Detergent #57, in the surge water, which is maintained at about 110° F. for a period of 3 to 5 minutes. The detergent is more specifically defined by the following identifying properties and physical characteristics:

12.9% moisture
10.5% active, predominantly alkyl aryl sulfonate, small percentage amide present
77.1% salt—
    19.7% sodium sulfate
    47.7% sodium carbonate
    29.2% sodium phosphates
pH, 8.8–9.0
Alkalinity—the alkalinity of Impco Detergent #57 titrated to a phenolphthalein end point is 4.1%. The total alkalinity titrated to a methyl orange end point is 35.0%.

A comparable material to Impco Detergent #57 is specifically defined by the following identifying properties:

| | Percent |
|---|---|
| Ultrawet K | 15 |
| Soda ash | 37 |
| Sodium tripoly phosphate | 22 |
| Sodium meta silicate | 7 |
| Anhydrous sodium sulfate | 19 |
| pH, 8.0–9.0. | |

Many standard solvents, such as methylene chloride, Cellosolve, MEK, and the like, as well as other detergent materials may be used in place of the water detergent rinse to effect cleaning of the article after impregnation. However, these solvents are not only toxic and costly but tend to leach out the impregnant. After rinsing, the articles are passed to the polymerization vessel 19 where curing of the impregnant is effected.

The articles are cured by submerging in a suitable curing agent, for example, Impco Curing Agent #37 identified as an ethylene oxide adduct of fractionated tallol acids, or the like. Other examples of curing agents that would be responsive to our process are available commercially under trade-names of Mobil Standard Oil of New York DTE Light Oil, also known as Sun Vis #150 Tempering Oil and TerEsso #43. Impco Curing Agent #37 is more specifically defined by the following identifying properties and physical characteristics:

| | |
|---|---|
| Flash point, open cup | None at 550° F. |
| Fire point | None at 550° F. |
| Smoke point | 420° F. |
| Viscosity— | |
| At 100° F. | 990 seconds. |
| At 210° F. | 168 seconds. |
| Specific gravity at 25/25° C. | 1.08. |
| Color | FAC 19 maximum. |
| Water | 2 to 3% by weight. |
| Acid value | 1% by weight. |
| Hydroxyl value | 55 to 63. |
| Total alkalinity | None. |

The curing agent of the type identified above is maintained at a temperature of 270° F. and the article cured for a period of not less than 75 minutes so that polymerization of the catalyzed monomeric impregnant within the interstices of the article is effected. After polymerization has been completed, the articles are removed from the polymerization vessel, drained of curing agent, and passed through a cleaning zone 20.

In the cleaning zone 20 the cured impregnated articles are first rinsed for a period of from 2 to 3 minutes with water maintained at a temperature of 140° F., followed by a 2- to 3-min. clear water rinse in water maintained at a temperature of 160° F.

An alternate cleaning method may be employed for washing in zone 18, in which the articles removed from the impregnating vessel are drained free of impregnant from the holes and pockets of the articles and then cleaned by submerging for not less than 30 seconds and not more than 1 minute in methylene chloride vapor maintained at 104° F.

The procedural steps of this invention produce a cured impregnated article 21 in which undesirable microscopic porosity is eliminated by filling the pores with a polymerized modified polyester resin. By use of the method set forth above, articles are produced that are not affected by bleeding of impregnant material before polymerization takes place, thereby producing a uniformly impregnated product of superior quality and reliability, which is capable of withstanding leak tests.

Furthermore, the above described novel method is carried out at low temperature, thereby eliminating the high-temperature processes formerly required to cure impregnating material.

It has also been found that articles impregnated as set forth above are resistant to constant operating temperatures in the range of from minus 65° F. to plus 350° F. and intermittently from minus 80° F. to plus 400° F. and in addition show unusual resistance to fuels, hot oils, alcohols, glycols, solvents, salts, and mild acids while being uninhibited by copper base alloys.

*Example I*

Twenty-eight crankcase front section magnesium castings were placed in a perchlorethylene vapor degreasing tank operating at a temperature of 250° F. to 255° F. for a period of 15 minutes after the castings had reached the operating temperature of the tank. The castings in the tank were continuously treated with vapors of perchlorethylene to remove dirt, grease, oil and the like, and to remove residual moisture therefrom.

The clean, pretreated castings were cooled to room temperature and passed into an impregnating vessel capable of withstanding internal and external pressure, such as an autoclave. Air within the vessel was exhausted until a vacuum of not less than 28 inches of mercury was obtained. The vacuum was held for a period of 15 minutes and at this time, Impco RC–2 catalyzed impregnating material was drawn into the evacuated vessel until the castings were completely covered with impregnant. The vacuum in the vessel was held at 28 inches of mercury for a period of 10 minutes after the castings were covered until all bubbling within the vessel ceased. The vacuum was then released and the vessel pressurized to 100 p.s.i. and this pressure was held for a period of 30 minutes. The pressure in the vessel was then reduced to about 10 p.s.i. and impregnant was permitted to flow from the impregnating tank into the storage tank. The pressure is the vessel was released through a vent to the atmosphere.

The impregnant was then drained from holes and pockets in the castings to prepare them for a cleaning operation. The castings were conveyed into a washing zone and subjected to a wash by surge water at a temperature of 110° F. with 0.5% solution of detergent therein for a period of 5 minutes. The castings were then rinsed in an automatic surge with 110° F. water for a period of 3 to 5 minutes.

After the castings from the washing zone were well drained, they were submerged in a polymerization vessel containing ethylene oxide adduct of fractionated tallol acids maintained at a temperature of 270° F. for a period of 75 minutes. The castings were then removed, drained, and rinsed in water at 140° for 3 minutes, followed by a 3-min. clear water rinse at 160° F.

A comparison was made between the twenty-eight castings subjected to the process of Example I and twenty-eight castings impregnated with the well-known styrene-castor oil method, which resulted in the following:

| Castings from process of Example I | Castings from Styrene-Castor Oil Process |
|---|---|
| 24 impervious to leaks. | All castings leaked. |

*Example II*

Twenty-eight crankcase front section magnesium castings were pretreated, impregnated and washed as in Example I. The castings removed from cleaning were then placed in a drying oven maintained at a temperature of 275° F. for a period of 70 minutes after the castings had reached oven temperature. The castings were removed from the oven and allowed to cool to room temperature.

It was found that castings cured in the drying oven had a tendency to bleed the impregnating material before curing and, while the results obtained during leak tests were satisfactory, it was found that the castings thus cured were not as uniformly impregnated as those tested in Example I.

Although machined castings are used in describing the process of this invention, it is to be understood that raw or partly machined castings may be treated in the manner set forth above. It is also to be understood that the process described above and set forth in the specific examples may be carried out in a continuous or in a semi-continuous manner.

Various changes may be made in the above invention and different embodiments of the invention may be made without departing from the scope thereof; therefore, it is intended that all matter contained in the above-described disclosure shall be interpreted as illustrative and not in a limiting sense.

I claim:

A process of impregnating a metallic casting having microscopic porosity with a polymerizable impregnant which comprises heating said casting at a temperature of about 225° to about 250° F. to remove moisture therefrom, treating said casting with a perchlorethylene vapor at a temperature of about 240° to about 260° F. to remove all foreign, oily or greasy substances therefrom, vacuumizing said casting under a vacuum of about 26 to about 29 inches of mercury for a period of about 15 to about 30 minutes while submerging the casting in a liquid impregnant consisting of an esterification product of an organic polyglycol with an unsaturated polybasic acid, diluted with monomeric styrene with styrene representing about 30 to about 80 percent by weight of the polyester and in the presence of a catalyst, releasing said vacuum, applying a pressure of about 100 p.s.i. to said submerged casting for a period of about 20 to about 60 minutes, washing said casting with hot water containing about 0.2 to about 1.0 percent by weight of a detergent at a temperature of about 100° to about 110° F. for a period of about 3 to about 10 minutes, rinsing said washed casting with water at a temperature of about 100° to about 110° F. for about 1 to about 3 minutes, polymerizing the casting in a bath of an ethylene oxide adduct of fractionated tallol acids maintained at a temperature of about 260° to about 280° F. for a period of about 65 to about 85 minutes, and rinsing the cured impregnated casting in water at a temperature of from about 140° to about 160° F. for a period of about 2 to about 5 minutes.

References Cited in the file of this patent

UNITED STATES PATENTS

| | | |
|---|---|---|
| 2,095,198 | Reid | Oct. 5, 1937 |
| 2,123,152 | Rivat | July 5, 1938 |
| 2,125,827 | Turkington | Aug. 2, 1938 |
| 2,457,657 | Glick | Dec. 28, 1948 |
| 2,599,943 | Russell | June 10, 1952 |
| 2,684,307 | Knapman et al. | July 20, 1954 |

FOREIGN PATENTS

| | | |
|---|---|---|
| 551,559 | Great Britain | Mar. 1, 1943 |